United States Patent
Jain (10) Patent No.: US 9,768,887 B2
(45) Date of Patent: Sep. 19, 2017

(54) DEVICE AND METHOD FOR PROVIDING POWER TO OPTICAL NETWORK UTILITIES

(71) Applicant: STERLITE NETWORKS LIMITED, Dadar Nagar Haveli (IN)

(72) Inventor: Vijay Jain, Banglore (IN)

(73) Assignee: STERLITE NETWORKS LIMITED, Dadar Nagar (IN)

( * ) Notice: Subject to any disclaimer, the term of this patent is extended or adjusted under 35 U.S.C. 154(b) by 77 days.

(21) Appl. No.: 14/367,899

(22) PCT Filed: Dec. 19, 2012

(86) PCT No.: PCT/IB2012/057469
§ 371 (c)(1),
(2) Date: Jun. 21, 2014

(87) PCT Pub. No.: WO2013/093793
PCT Pub. Date: Jun. 27, 2013

(65) Prior Publication Data
US 2014/0369687 A1  Dec. 18, 2014

(30) Foreign Application Priority Data

Dec. 21, 2011 (IN) .................... 3591/MUM/2011

(51) Int. Cl.
*H04B 10/27* (2013.01)
*H04L 12/10* (2006.01)
*H04B 10/80* (2013.01)
*H02J 3/02* (2006.01)

(52) U.S. Cl.
CPC .............. *H04B 10/808* (2013.01); *H02J 3/02* (2013.01); *H04B 10/27* (2013.01); *H04L 12/10* (2013.01); *Y10T 307/492* (2015.04)

(58) Field of Classification Search
None
See application file for complete search history.

(56) References Cited

U.S. PATENT DOCUMENTS

| | | |
|---|---|---|
| 2008/0159744 A1 | 7/2008 | Soto et al. |
| 2009/0060531 A1 | 3/2009 | Biegert et al. |
| 2010/0103943 A1 | 4/2010 | Walter |

*Primary Examiner* — Darren E Wolf (57) ABSTRACT

Disclosed is a device (1000) for providing power to one or more Optical Network Utilities (NUs) (1100) in an optical network (1300) used to provide communication to a plurality of devices (1400) of subscribers. The device (1000) includes one or more Power over Ethernet (POE) adapters (1200) operatively coupled to the subscriber devices. The POE adapters are configured to derive AC power and data signals from the plurality of devices, and convert the derived AC power into DC signals. Further, the device includes a Power over Ethernet (POE) splitter (1500) operatively coupled to the POE adapters. The POE splitter is configured to split the DC signals from the data signals, and feed the DC signals to the one or more NUs for satisfying their power needs.

9 Claims, 8 Drawing Sheets

DEVICE AND METHOD FOR PROVIDING POWER TO OPTICAL NETWORK UTILITIES

TECHNICAL FIELD

This invention relates to power systems, and more particularly, to device for providing power to various utilities in an optical network.

BACKGROUND ART

Various utilities called as Network Utilities or NUs are used in optical networks, such as hybrid fibre coaxial networks (HFCNs), for providing a variety of services, like telephony, cable television and internet, to subscribers. Examples of the NUs include Optical Network Units (ONUs), Optical Network Terminals (ONTs), and Optical Line Terminals (OLTs). ONUs are multiple subscriber devices installed near to a subscriber's complex for terminating any one of the endpoints of a fiber in order to provide multiple services to the subscribers. Similarly, Optical Network Terminals (ONTs) are installed at a subscriber's premises for converting fiberoptic light signals to copper/electric signals. The ONTs are generally disposed in an enclosure, generally called a telecom box, which is positioned at the subscriber's premises. The ONTs demultiplex the optical signal received from the service provider into its various components, viz. telephony, cable television and data. The optical signal is transmitted to the ONTs through a fibre optic cable while the demultiplexed component signals from the ONTs are transmitted to the subscriber's home by using various output cables, such as CAT 6, RJ-11 and the like, corresponding to the type of component signals.

It will be apparent to a person skilled in the art that these NUs (ONUs and ONTs) require power for their operation. However it is generally observed that power source is not in proximity to the NUs and as a result providing power to the NUs becomes a difficult task. Also, at times alternate arrangements such as back-up batteries are required to be provided due to which special provisions are to be provided for storing the batteries.

Accordingly, there exists a need for providing an arrangement for providing power to NUs disposed in telecom boxes in a simple and convenient manner.

There further exists a need for providing an arrangement for providing power to NUs which dispenses with the requirement of providing alternate power arrangements, such as backup batteries.

SUMMARY OF INVENTION

In view of the foregoing disadvantages inherent in the prior art, the general purpose of the present invention is to conveniently provide power to NUs disposed in telecom boxes or telecom shafts.

Accordingly, an object of the present invention is to provide a device for providing power to NUs disposed in telecom box or telecom shaft in a simple and convenient manner.

Another object of the present invention is to provide a device for providing power to NUs such that the device dispenses with the requirement of providing alternate power arrangements, such as back-up batteries.

Yet another object of the present invention is to provide a device and method for better utilization of power in optical networks.

Yet another object of the present invention is to provide a device and method for better utilization of power in optical networks and ensuring that the overall cost to the subscriber for subscribing of various services are lowered.

Yet another object of the present invention is to provide a device and method for better utilization of power in optical networks and ensuring that the overall Opex cost is reduced.

Yet another object of the present invention is to provide a device and method for better utilization of power in optical networks and precluding the use of multiple power points in subscriber's premises or complex.

These and other objects and advantages of the invention will be clear from the ensuing description.

In light of the above objects, a device adapted to provide power to NUs in an optical network is disclosed.

In one aspect, the present invention discloses a device for providing power to one or more Network Utilities (NUs) in an optical network, which is used to provide communication to a plurality of devices of subscribers. The device includes one or more Power over Ethernet (POE) adapters operatively coupled to the plurality of devices of the subscribers. The one or more POE adapters are configured to derive AC power and data signals from the plurality of devices, and convert the derived AC power into DC signals. Further, the device includes at least one Power over Ethernet (POE) splitter operatively coupled to the one or more POE adapters. The POE splitter is configured to split the DC signals from the data signals, and feed the DC signals to the one or more NUs for satisfying their power needs.

In yet another aspect, the present invention discloses a device for providing power to an Optical Network Unit (ONU) in an optical network, which is used to provide communication to a plurality of devices of subscribers. The device includes one or more Power over Ethernet (POE) adapters operatively coupled to the plurality of devices of the subscribers. The one or more POE adapters are configured to derive AC power and data signals from the plurality of devices, and convert the derived AC power into DC signals. Furthermore, the device includes a Power over Ethernet (POE) splitter operatively coupled to the one or more POE adapters. The POE splitter is configured to split the DC signals from the data signals, and feed the DC signals to the ONU for satisfying its power needs.

In yet another aspect, the present invention discloses a device for providing power to Optical Network Terminals (ONTs) in an optical network, which is used to provide communication to a plurality of devices of subscribers. The device includes a Power over Ethernet (POE) adapter operatively coupled to the plurality of devices of the subscribers. The POE adapter is configured to derive AC power and data signals from the plurality of devices, and convert the derived AC power into a DC signal. Further, the device includes a Power over Ethernet (POE) splitter operatively coupled to the POE adapter. The POE splitter is configured to split the DC signal received from the data signal, divide the DC signal into multiple DC signals, and feed the multiple DC signals to the ONTs for satisfying their power needs.

In yet another aspect, the present invention provides a method for providing power to one or more NUs in an optical network used to provide communication to a plurality of devices of subscribers. The method includes deriving AC power and data signals from the plurality of devices of the subscribers, wherein the AC power is being derived by employing one or more Power over Ethernet (POE) adapters. Further, the method includes down converting the AC power into DC signals and carrying forward the data signals, and splitting the data signals from the DC signals, wherein the splitting is being done by a POE splitter. The method also includes supplying the DC signals to the one or more NUs for satisfying their power needs.

These aspects together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawing and descriptive matter in which there is illustrated an exemplary embodiment of the present invention.

BRIEF DESCRIPTION OF THE DRAWINGS

The advantages and features of the present invention will become better understood with reference to the following detailed description taken in conjunction with the accompanying drawings, in which.

Like reference numerals refer to like parts throughout the description of several views of the drawing.

DETAILED DESCRIPTION OF THE DISCLOSURE

The exemplary embodiments described herein detail for illustrative purposes are subject to many variations in structure and design. It should be emphasized, however, that the present invention is not limited to a particular device for providing power to NUs as described. It is understood that various omissions and substitutions of equivalents are contemplated as circumstances may suggest or render expedient, but these are intended to cover the application or implementation without departing from the spirit or scope of the present invention.

The terms "a" and "an" herein do not denote a limitation of quantity, but rather denote the presence of at least one of the referenced item.

The terms "having", "comprising", "including", and variations thereof signify the presence of a component.

The present invention provides devices and methods for providing power to one or more Optical Network Utilities (OUs) in an optical network. It should be understood that the term Optical network' as mentioned herein refers to an overlay of various devices including electronic and computing devices, controllers, processors, microprocessors, cables, such as fiber-optic cables, and other devices enabling communication, and specifically fiber-optic communication, between one or more service providers at one end and one or more subscribers (customers) at the other end. It should be further understood that such network may include a plurality of devices, such as computing and electronic devices, which may be required to be provided with various services, such as telephony, cable television and internet, at the subscriber's end. Further, it should be understood that though the present invention is explained with reference to a network, which is similar to a typical optical network, such as Passive Optical Network (PON), the present invention is equally applicable to provide power in any access network, whether point to point or point to multipoint, such as BPON (ATM-based Broadband PON), GPON (Gigabit PON), EPON (Ethernet PON), or in general XPON or XGPON or XEPON, and the like.

Figure 1:
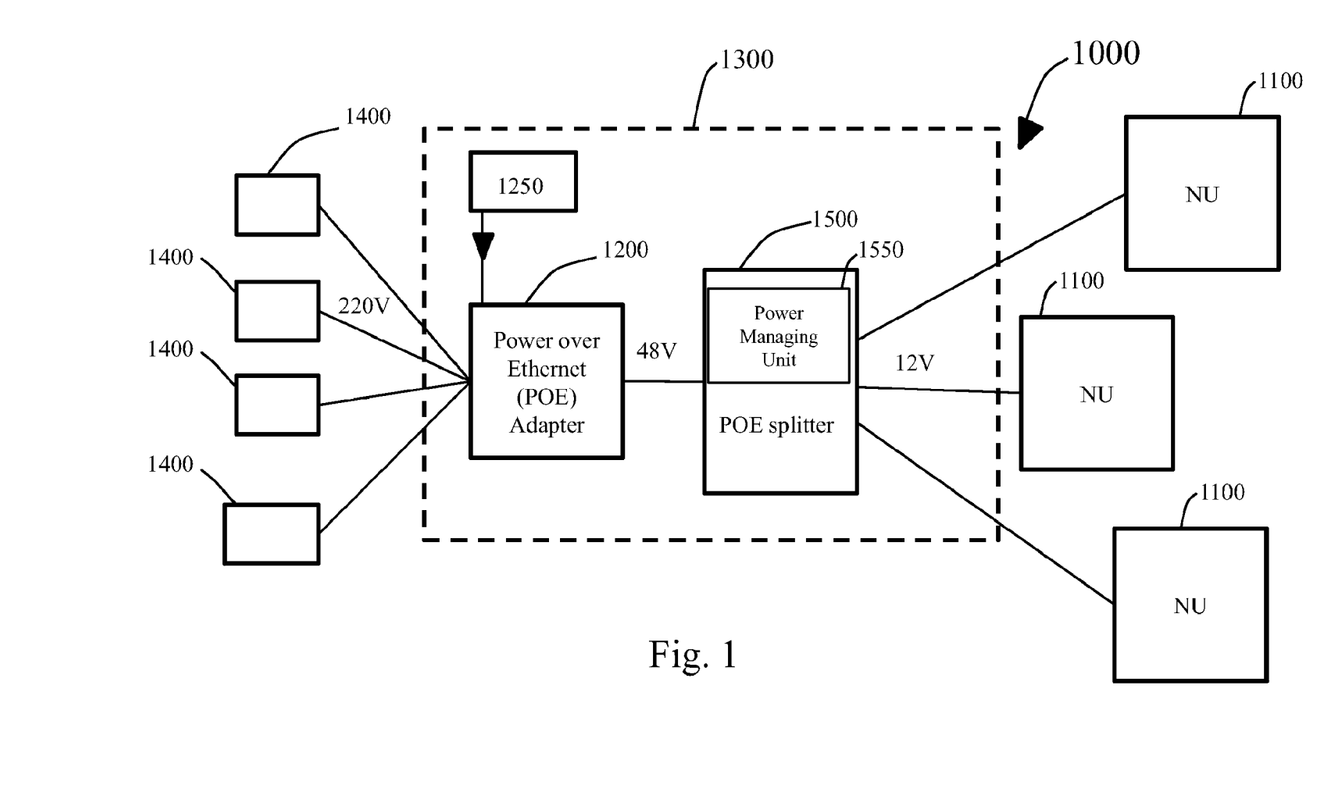
FIG. 1 illustrates a block diagram of the device for providing power to NUs, in accordance with various embodiments of the present invention.

FIG. 1 illustrates a device 1000 adapted to provide power to one or more Network Utilities (NUs) 1100 in an optical network 1300. It will be understood that the optical network 1300 is used to provide communication or services to a plurality of devices 1400 (interchangeably referred to as subscriber devices 1400) at subscribers end. Suitable examples of such devices 1400 may include, but are not limited to, a Personal Computer (PC), such as a laptop, a phone, such as a mobile phone, a VoIP phone, a television set, a set top box, a Wi-Fi router, and the like.

Figure 4:
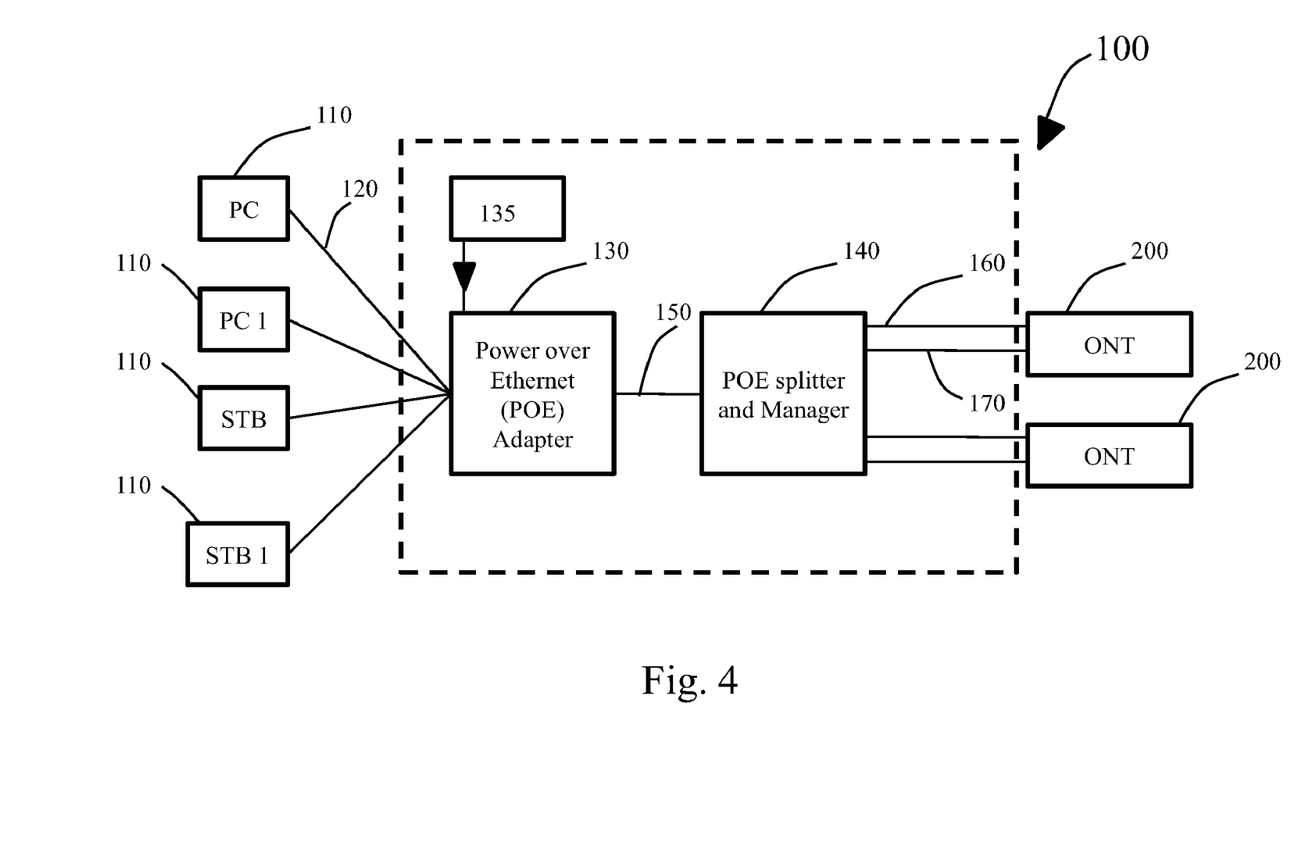
FIG. 4 illustrates a block diagram of the device for providing power to multiple ONTs, in accordance with various embodiments of the present invention.
Figure 7:
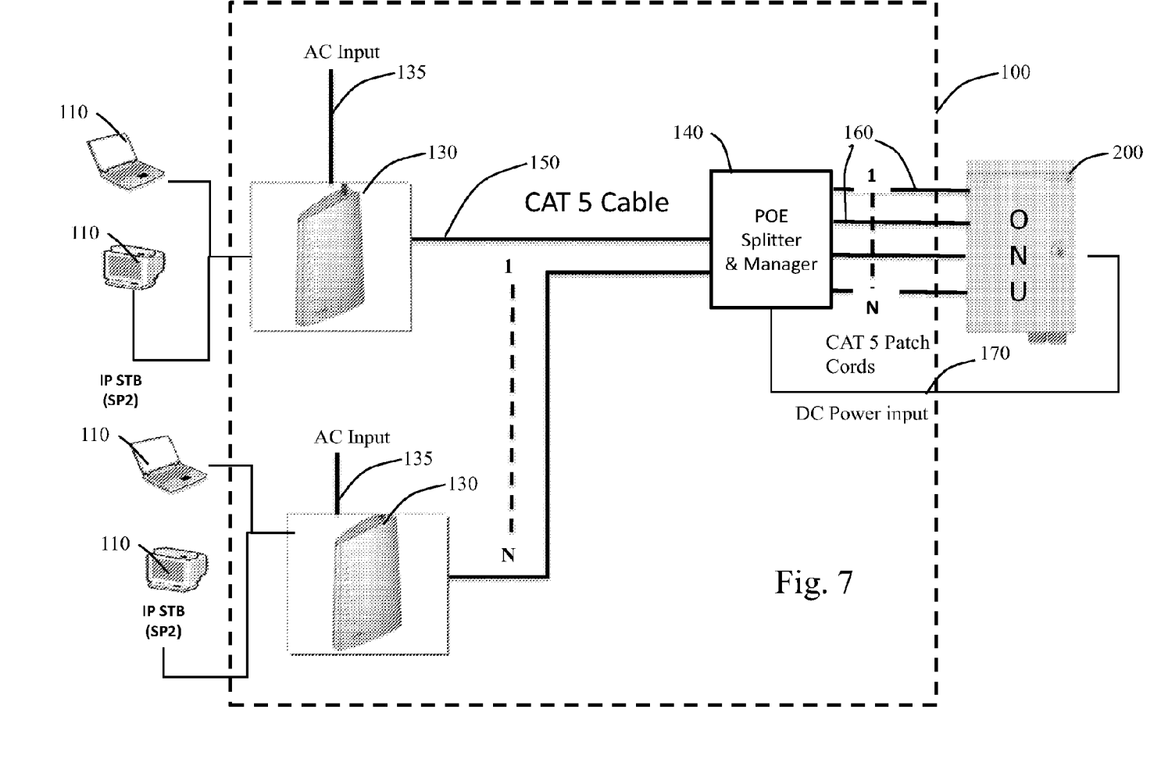
FIG. 7 illustrates a schematic representation of the device of FIG. 6, in accordance with various embodiments of the present invention.

As shown in FIG. 1, the device 1000 includes one or more Power over Ethernet (POE) adapters 1200. In one embodiment, these POE adapters 1200 are operatively coupled to the plurality of subscriber devices 1400. In one embodiment, one or more ports (not shown) of the POE adapters 1200 are operatively coupled to one or more Local Area Network (LAN) ports or Wide Area Network (WAN) ports (not shown) of the subscriber devices 1400. In one embodiment, the operational coupling of the POE adapters 1200 to the plurality of subscriber devices 1400 is done using cables, such as CAT 5 cables. However, it should be understood that such means of coupling should not be in any ways construed as a limitation to the present disclosure. In another embodiment, the coupling may be done via any other compliant cable, such as a CAT 6 cable, and the like. Further, in one embodiment, the POE adapters 1200 may be inbuilt inside the subscriber devices 1400. Such implementation is shown in FIGS. 4 and 7, wherein the POE adapters 1200 are shown to be build into a Wi-Fi device at the subscriber's end.

Now referring again to FIG. 1, the operational coupling of the POE adapters 1200 configures the POE adapters 1200 to drive data signals from the plurality of devices 1400. Further, the POE adapters 1200 are being supplied with 220 V AC power for their sustainable operation via external power source 1250. Such operational coupling configures the POE adapters 1200 to drive 220 Volts (V) AC power from the external power source 1250 and data from the plurality of devices 1400. However, it should be clearly understood that the 220 V specification as mentioned herein may depend from country to country and should not be construed as a limitation to the present disclosure. Accordingly, in one embodiment, the POE adapters 1200 may be supplied with 110 V AC power. In one embodiment, the operational coupling may also allow the POE adapters 1200 to drive power directly from the plurality of devices 1400.

In one embodiment, the POE adapters 1200 may also be configured to convert the derived AC power into DC signals.

In an embodiment, the POE adapters 1200 may be configured to convert the derived 220V AC power into 48V DC signals.

As shown in FIG. 1, the device 1000 further includes a Power over Ethernet (POE) splitter 1500. The POE splitter 1500 may be operably coupled to the POE adapters 1200. Specifically, one or more ports of the POE splitter 1500 may be coupled to one or more ports (not shown) of the POE splitter 1500. In one embodiment, the operational coupling of the POE splitter 1500 to the POE adapters 1200 is done using cables, such as CAT 5 cables. However, it should be understood that such means of coupling should not be in any ways construed as a limitation to the present disclosure. In an embodiment, the coupling may be done via any other compliant cable, such as a CAT 6 cable, and the like.

In one embodiment, the POE splitter 1500 is configured to carry the DC signals and the data signals from the POE adapters 1200. In one embodiment, the POE splitter 1500 may be further configured to split the DC signals from the data signals. In one embodiment, the POE splitter 1500 may be additionally configured to down convert the 48V DC signals to 12V DC signals. The POE splitter 1500 may include a down converter for enabling such down conversion.

The splitting of the DC signals and the data signals separates the data signals from the DC signals. The POE splitter 1500 may accordingly be configured to feed the DC signals to the NUs 1100 for satisfying their power needs. More specifically, the POE splitter 1500 may be operably coupled to one or more data and power ports of the NUs 1100 via one or more patch chords or cables, such as CAT 5 cables or chords, to enable the feeding of DC signals. However, it should be understood that such means of coupling should not be in any ways construed as a limitation to the present invention. In another embodiment, the coupling may be done via any other compliant cable, such as a CAT 6 cable, and the like. The data signals may also be fed to the NUs 1100 for maintaining the data integrity and allowing the NUs 1100 to transmit the data and visa versa.

In one embodiment, the device 1000 may additionally include a power managing unit 1550 integrated with the POE splitter 1500. The power managing unit 1550 may be configured for managing power to the NUs 1100. More specifically, the power managing unit 1550 may allow an equitable distribution of the DC signals to each of the NUs 1100.

In one embodiment, the device 1000 may also include one or more external power sources configured to satisfy auxiliary power requirements of the device 1000. However, it should be clearly understood that such provision of providing additional power means should not be construed as a limitation to the present invention. The device 1000 may be adapted to operate without the auxiliary means in normal operation.

The derived power may be supplied to the internal circuitry of the NUs 1100 for powering the internal circuitry. The internal circuitry may include one or more processors and other components which may be required to be powered for running the NUs1 1100.

As mentioned above, the device 1000 is capable of providing power to variety of NUs, such as Optical Network Terminals (ONTs) and Optical Network Units (ONUs), in an optical network. Such capabilities of the device 1000 will now be explained one by one with reference to FIGS. 2-7.

Figure 2:
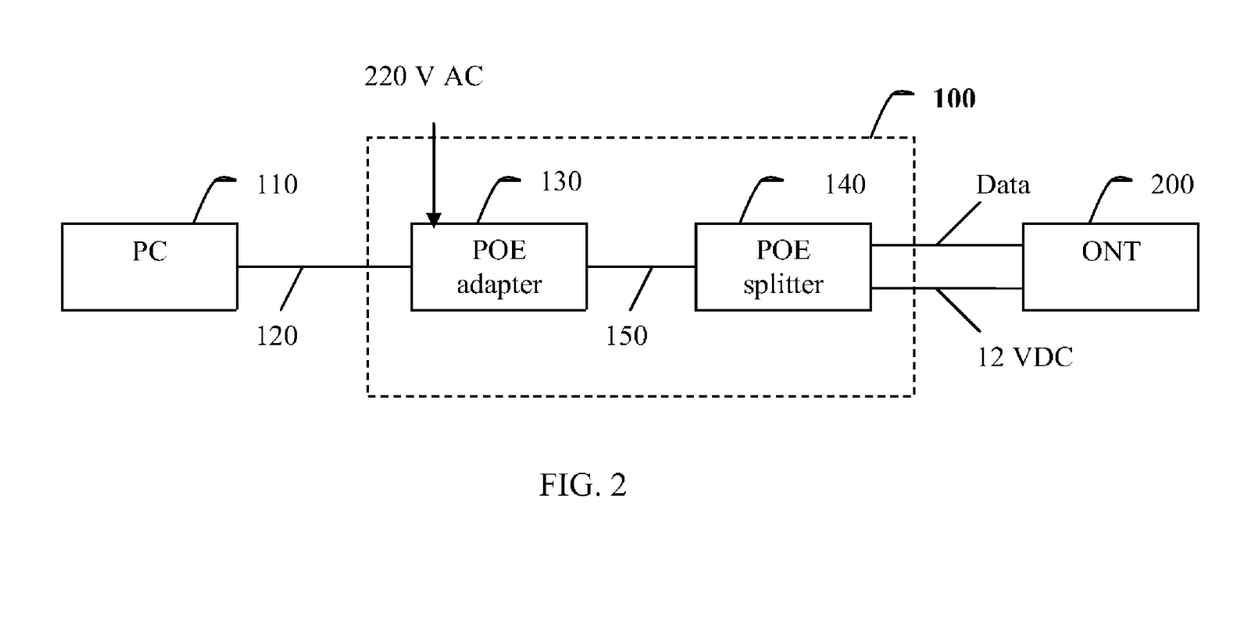
FIG. 2 illustrates a block diagram of the device for providing power to an ONT, in accordance with various embodiments of the present invention.
Figure 3:
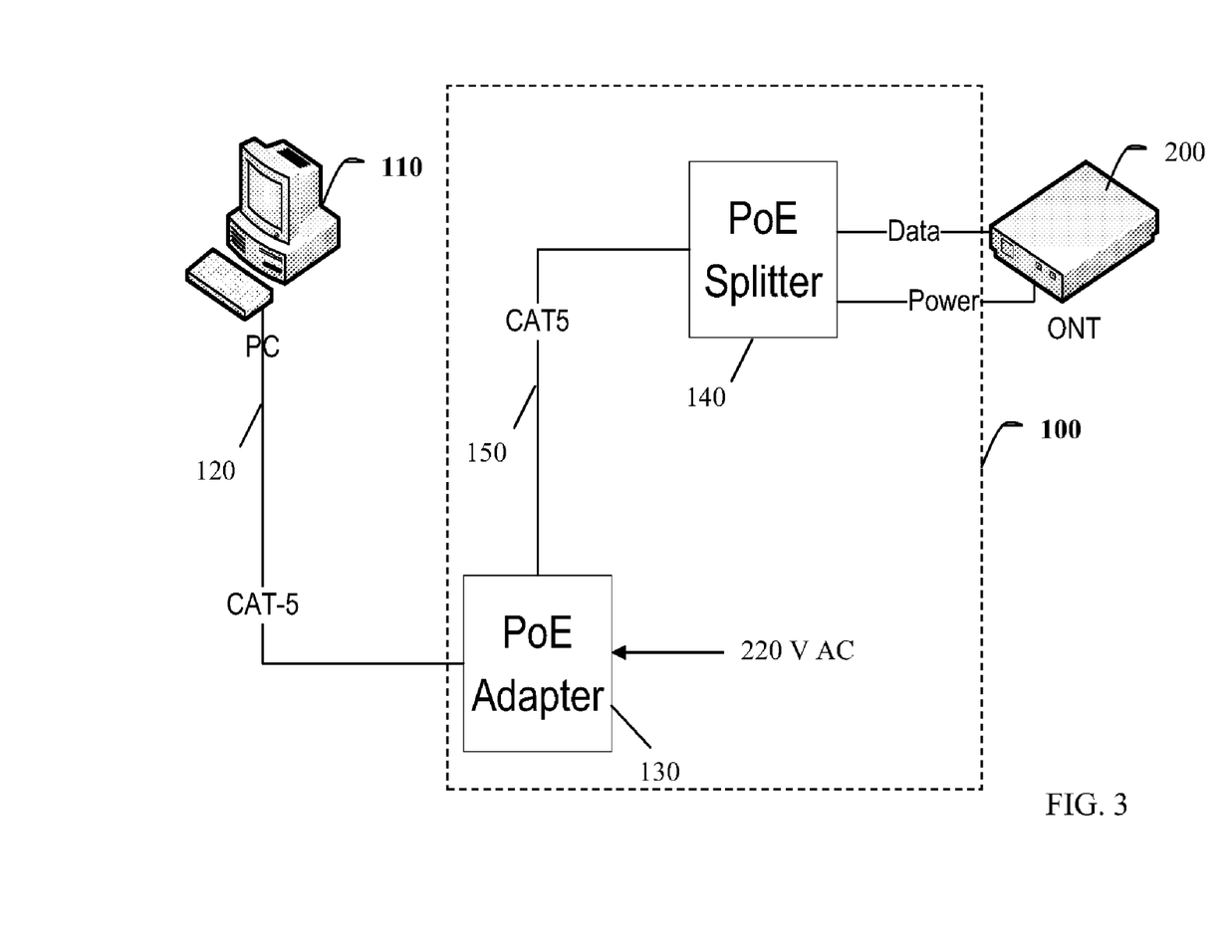
FIG. 3 illustrates a schematic representation of the device of FIG. 2, in accordance with various embodiments of the present invention.

Referring now to FIGS. 2-3, there is shown the device 100 for providing power to an ONT 200. As shown in FIGS. 2-3, the device 100 is configured to be connected to a plurality of devices 110 at subscriber's end. Now referring specifically to FIG. 3, there is shown the device 100, which is adapted to be connected to a personal computer (PC) 110 at a subscriber's premises. The operable connection between the PC 110 and the device 100 allows for the device 100 to derive data from the PC 110. The exact mechanism of the derivation of data will be explained in the foregoing description.

In various embodiments of the present disclosure, the device 100 is connected to the PC 110 through a CAT 5 cable 120, as shown in FIG. 2. More particularly, the PC 110 receives data signal, which is tapped by the CAT 5 cable 120, at the subscriber's premises and then directed into the device 100. More particularly, the CAT 5 cable 120 is also adapted to carry data signals exchanged between the PC 110 and the ONT 200 through the device 100. However, it should be clearly understood that such use of the CAT 5 cable should not be construed as a limitation to the present disclosure. Accordingly, in alternative embodiments of the present disclosure, any other Ethernet compatible cables, such as CAT 6 cables, capable of adapting to provide aforementioned functionalities and operating on any standards may be equally used in the present invention.

Further, as shown in FIG. 2-3, the device 100 includes a Power over Ethernet (POE) adapter 130 that receives the 220V AC power signal from an external power supply along with data signal from the PC 110. In one embodiment, the POE adapter 130 receives the data signal from the PC 110 via the CAT 5 cable 120. The adapter 130 is adapted to convert the 220V AC power signal to 48 V DC signal, and retaining the data signal as it is actually. In one embodiment, the adapter 130 may be configured to receive 12 V DC from an external AC adapter. Such external adapter may be provided to meet the auxiliary power requirements of the device 100. However, it should be clearly understood that such provision of providing additional power means should not be construed as a limitation to the present disclosure. The device 100 may be adapted to operate without the auxiliary means in normal operation.

Further, the device 100 also includes a Power over Ethernet (POE) splitter 140 electrically coupled to the POE adapter 130 by a CAT 5 cable 150. However, it should be apparent to a person skilled in the art that the electrical coupling of the POE splitter 140 with the POE adapter 130 may be done using any other compliant cable. Accordingly, in alternative embodiments of the present disclosure, any other Ethernet compatible cables, capable of adapting to provide aforementioned functionalities and operating on any standards may be equally used in the present invention.

The POE splitter 140 is adapted to receive the 48V DC signal and data signal from the POE adapter 130. More specifically, the POE splitter 140 is adapted to receive the 48V DC signal and data signal from the POE adapter 130 via CAT 5 cable 150. Further, in an embodiment of the present invention, the POE splitter 140 is adapted to split this combinational signal into 48 V DC signal and a data signal. In an embodiment of the present invention, the POE splitter 140 may down convert the 48 V DC signal to a 12 V DC signal, prior to outputting the same, as per the requirement of the ONT.

After the splitting done by the POE splitter 140, the data signal is provided to the ONT 200, as shown in FIG. 2. Also, either the 48 V DC signal or the down-converted 12 V DC signal is provided to the ONT 200 for providing the required power thereto.

Figure 5:
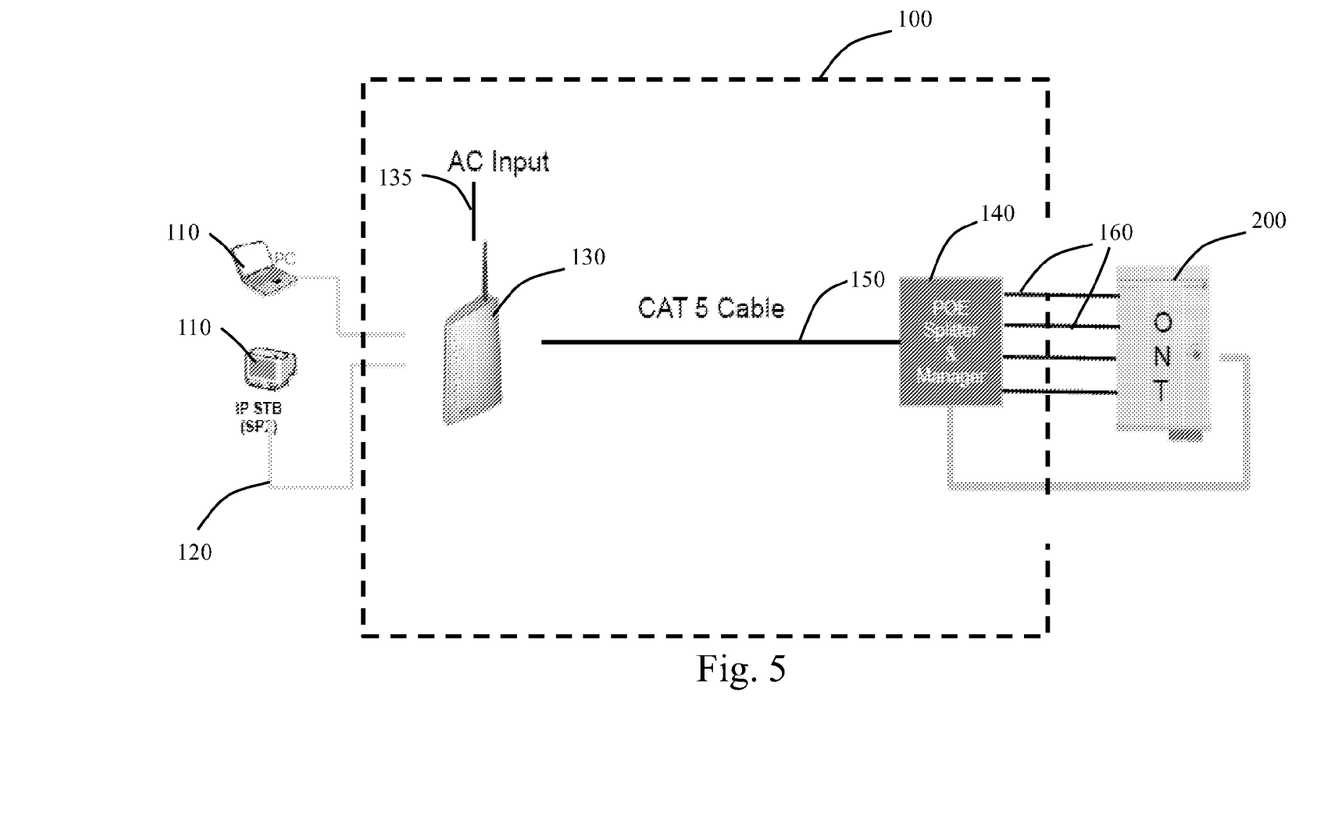
FIG. 5 illustrates a schematic representation of the device of FIG. 4, in accordance with various embodiments of the present invention.

Now referring to FIGS. 4-5, there is shown the device 100 for providing power to multiple ONTs 200. As shown in FIG. 5, the device 100 is shown to be connected to a personal computer (PC) 110, or more particularly a laptop computer, and a set top box, at 2 different subscriber's premises. It should be understood that the operable connection between the plurality of devices 110 and the device 100 allows for the device 100 to derive data signal from the plurality of devices 110.

In various embodiments of the present disclosure, the device 100 is connected to the plurality of devices 110 through a CAT 5 cable 120, as shown in FIGS. 4-5. More particularly, the plurality of devices 110 may receive 220V AC power signal from an external power source required for the operation thereof. The CAT 5 cable 120 is also adapted to carry data signal exchanged between the plurality of devices 110 and the ONTs 200 through the device 100. However, it should be clearly understood that such use of the CAT 5 cable should not be construed as a limitation to the present disclosure. Accordingly, in alternative embodiments of the present disclosure, any other Ethernet compatible cables, such as CAT 6 cables, capable of adapting to provide aforementioned functionalities and operating on any standards may be equally used in the present invention.

Further, as shown in FIG. 4, the device 100 includes a Power over Ethernet (POE) adapter 130 that receives the 220V AC power signals along with data signals from the plurality of devices 110. In one embodiment, the POE adapter 130 receives the 220V AC power signal from an external power source 135, along with the data signals from the plurality of devices 110 via the CAT 5 cable 120. The adapter 130 is adapted to convert the 220V AC power signals to a down converted signal, such as a 48 V DC signal, and retaining the data signals as they are actually. The external power source 135 may be provided to meet the auxiliary power requirements of the device 100. However, it should be clearly understood that such provision of providing additional power means should not be construed as a limitation to the present disclosure. The device 100 may be adapted to operate without the auxiliary means in normal operation.

Further, the device 100 also includes a Power over Ethernet (POE) splitter 140 electrically coupled to the POE adapter 130 by a CAT 5 cable 150. However, it should be apparent to a person skilled in the art that the electrical coupling of the POE splitter 140 with the POE adapter 130 may be done using any other compliant cable. Accordingly, in alternative embodiments of the present disclosure, any other Ethernet compatible cables, capable of adapting to provide aforementioned functionalities and operating on any standards may be equally used in the present invention.

The POE splitter 140 is adapted to receive the down converted signal, such as the 48V DC signal, and data signals from the POE adapter 130. More specifically, the POE splitter 140 is adapted to receive the down converted signal, such as the 48V DC signal, and data signals from the POE adapter 130 via CAT 5 cable 150. Further, in an embodiment of the present invention, the POE splitter 140 is adapted to split this combinational signal into 48 V DC signal and data signals. In an embodiment of the present invention, the POE splitter 140 may further down convert the 48 V DC signal to a 12 V DC signal, prior to outputting the same, as per the requirement of the ONTs 200.

In one embodiment, the device 100 may additionally include a power managing unit (shown as integrated with the POE splitter 140) operatively coupled to the POE splitter 140. The power managing unit is capable of managing distribution of DC signals split at the POE splitter 140.

After the splitting is done by the POE splitter 140, the data signals are provided to the ONTs 200, as shown in FIG. 4 via multiple chords 160. Also, either the 48 V DC signal or the down converted 12 V DC signals are provided to the ONTs 200 for providing the required power thereto via cable 170. In this manner, the device 100 is configured to provide power to multiple ONTs in the optical network.

Figure 6:
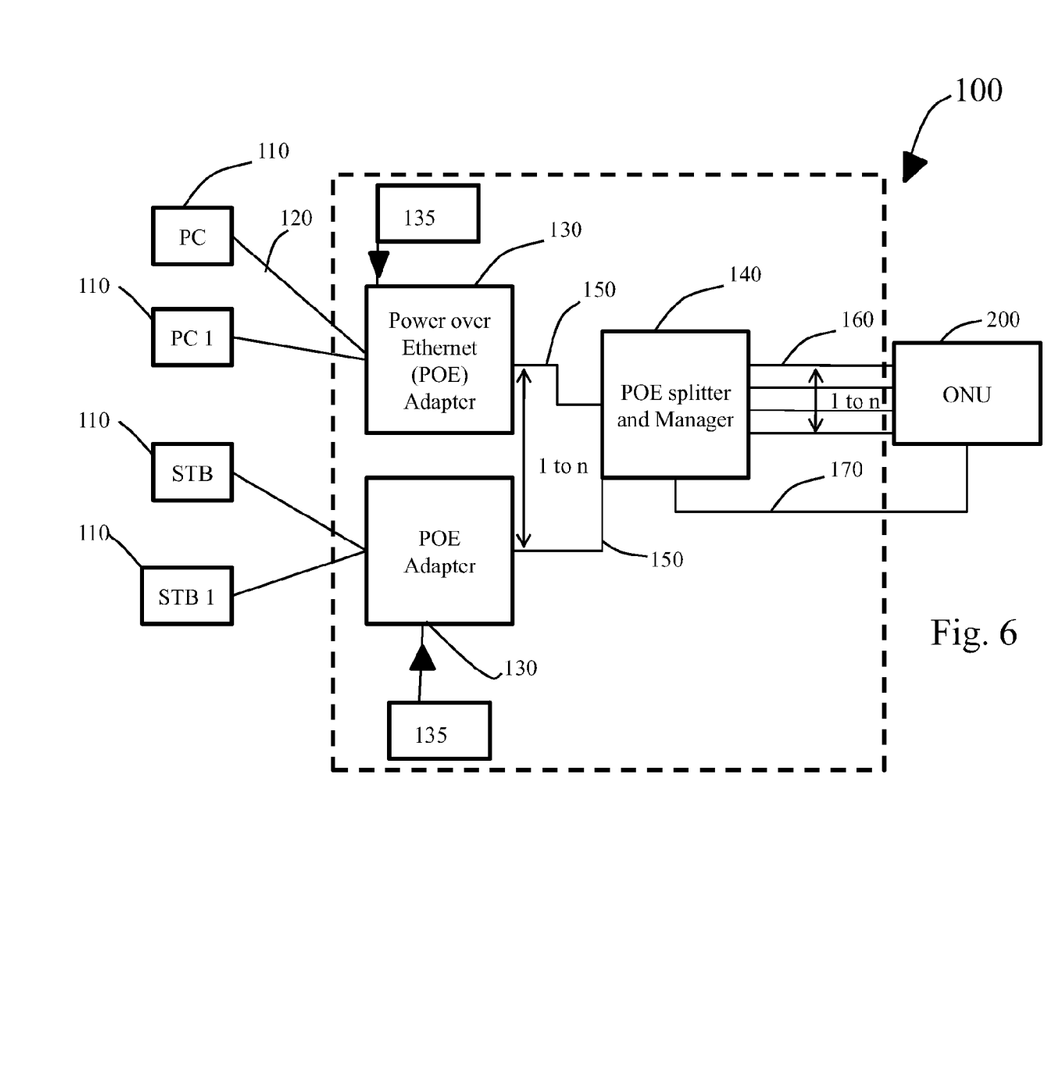
FIG. 6 illustrates a block diagram of the device for providing power to an ONU, in accordance with various embodiments of the present invention.

Now referring to FIGS. 6-7, there is shown the device 100 for providing power to an ONU 200. It is to be noted that the device 100 may provide power to a number of ONUs (not shown) simultaneously, however, for sake of brevity the present invention shall be described in conjunction with only one ONU 200. It should be clearly understood that such explanation should not be construed as a limitation to the present invention. Therefore, in one embodiment of the present disclosure, the device 100 is adapted to provide power to a plurality of ONUs, such as 3 ONUs, at a time.

Now referring specifically to FIG. 6, there is shown the device 100, which is adapted to be connected to a plurality of devices 110 at subscriber's end. In the FIG. 7, the device 100 is shown to be connected to a personal computer (PC) 110, or more particularly a laptop computer, and a set top box, at 2 different subscriber's premises. Further, it should be understood that though in FIG. 6, the device 100 is shown to be connected to 4 devices at the subscriber's end, such configuration should not be in any ways construed as a limitation to the present invention. Accordingly, the device 100 may be capable of connecting to "n" number of devices at the subscriber's end.

The operable connection between the plurality of devices 110 and the device 100 allows for the device 100 to derive power from external power source 135 and data signals from the plurality of devices 110. The exact mechanism of the derivation of power will be explained in the foregoing description.

In various embodiments of the present disclosure, the device 100 is connected to the plurality of devices 110 through a CAT 5 cable 120, as shown in FIGS. 6-7. More particularly, the plurality of devices 110 may receive 220 Volts (V) AC power signals, required for the operation thereof. The CAT 5 cable 120 is also adapted to carry data signals exchanged between the plurality of devices 110 and the ONU 200 through the device 100. However, it should be clearly understood that such use of the CAT 5 cable should not be construed as a limitation to the present invention. Accordingly, in alternative embodiments of the present disclosure, any other Ethernet compatible cables, such as CAT 6 cables, capable of adapting to provide aforementioned functionalities and operating on any standards may be equally used in the present invention.

Further, as shown in FIG. 6, the device 100 includes Power over Ethernet (POE) adapters 130 that receive the 220V AC power signals along with data signals from the plurality of devices 110. It should be clearly understood that though FIGS. 6-7 depict 2 POE adapters, such depiction should not be construed as a limitation to the present invention. Accordingly, in one embodiment, the device 100 may include 'n' number of adapters operably coupled to the devices 110.

In one embodiment, the POE adapters 130 receive the 220V AC power signals along with the data signals from the plurality of devices 110 via the CAT 5 cable 120. The POE adapters 130 are adapted to convert the 220V AC power signals to down converted signals, such as 48 V DC signals, and retaining the data signals as they are actually. In one embodiment, the POE adapters 130 may be configured to receive an external AC input 135, such as a 220 V AC from an external AC adapter. Such external adapter may be provided to meet the auxiliary power requirements of the device 100. However, it should be clearly understood that such provision of providing additional power means should not be construed as a limitation to the present disclosure. The device 100 may be adapted to operate without the auxiliary means in normal operation.

Further, the device 100 also includes a Power over Ethernet (POE) splitter 140 electrically coupled to the POE adapters 130 by a CAT 5 cable 150. However, it should be apparent to a person skilled in the art that the electrical coupling of the POE splitter 140 with the POE adapters 130 may be done using any other compliant cable. Accordingly, in alternative embodiments of the present disclosure, any other Ethernet compatible cables, capable of adapting to provide aforementioned functionalities and operating on any standards may be equally used in the present invention.

The POE splitter 140 is adapted to receive the down converted signals, such as the 48V DC signal, and data signals from the POE adapter 130. More specifically, the POE splitter 140 is adapted to receive the down converted signals, such as the 48V DC signals, and data signals from the POE adapter 130 via CAT 5 cable 150. Further, in an embodiment of the present invention, the POE splitter 140 is adapted to split this combinational signal into 48 V DC signal and data signals. In an embodiment of the present invention, the POE splitter 140 may down convert the 48 V DC signals to 12 V DC signals, prior to outputting the same, as per the requirement of the ONU 200.

In one embodiment, the device 100 may additionally include a power managing unit (shown as integrated with the POE splitter 140) operatively coupled to the POE splitter 140. The power managing unit is capable of managing distribution of DC signals split at the POE splitter 140.

After the splitting is done by the POE splitter 140, the data signals are provided to the ONU 200, as shown in FIG. 4 via multiple chords 160. Also, either the 48 V DC signals or the down converted 12 V DC signals are provided to the ONU 200 for providing the required power thereto via cable 170. In this manner, the device 100 is configured to provide power to multiple ONUs in the optical network.

In another aspect, the present disclosure provides a block diagram of a method for providing power to one or more OUs in an optical network used to provide communication to a plurality of devices of subscribers. The method will be explained with reference to method 500 in FIG. 8.

Figure 8:
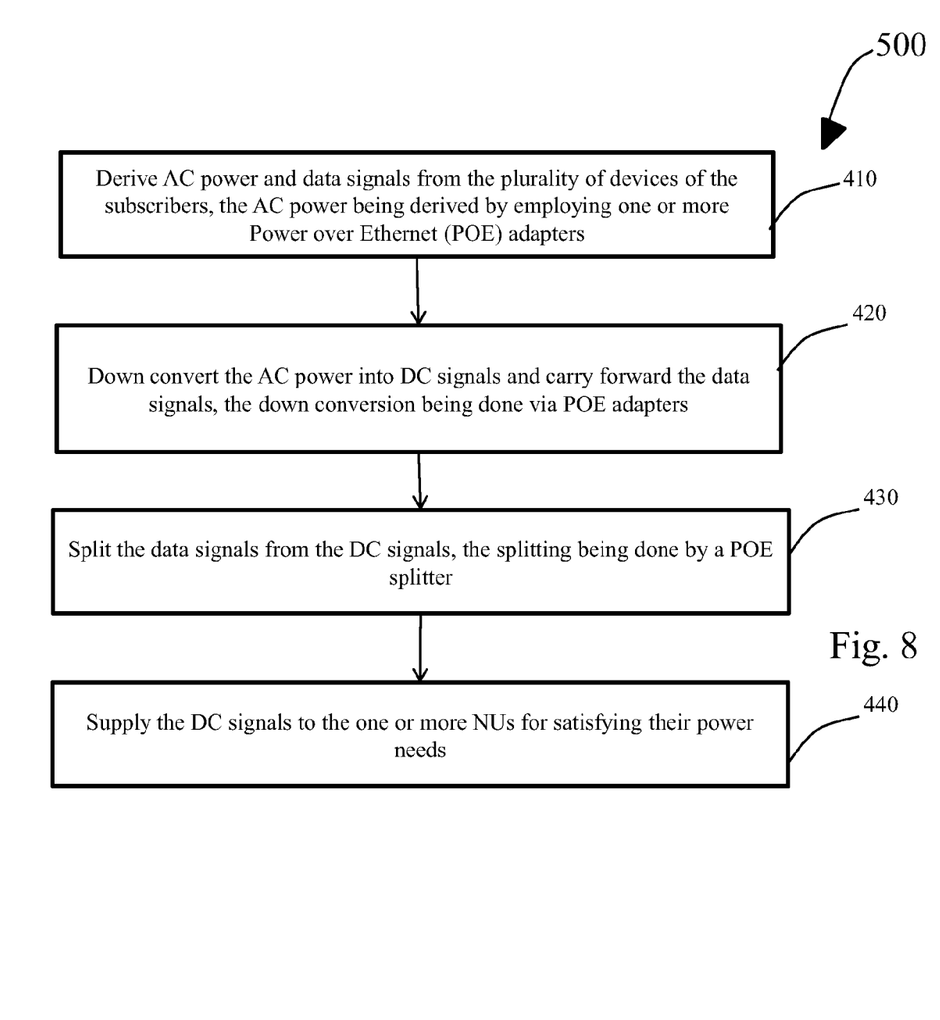
FIG. 8 illustrates a block diagram of a method for providing power to one or more OUs in an optical network.

As shown in FIG. 8, the method 500 initiates at block 410. At block 410, the method 500 derives AC power and data signals from the plurality of devices of the subscribers, the AC power being derived by employing one or more Power over Ethernet (POE) adapters, such as the POE adapter 130. In one embodiment, the method 500 includes deriving 220V AC power from the plurality of devices of the subscribers.

Thereafter, the method 500 includes down converting the AC power into DC signals and carrying forward the data signals, at block 420. In one embodiment, the down conversion may be done using the POE adapters, such as the POE adapter 130.

After the down conversion of the AC power into the DC signals, the method 500 includes splitting the data signals from the DC signals, at block 430. The splitting of the DC signals from the data signals may be done using a POE splitter, such as the POE splitter 140. The method 500 further includes supplying the DC signals to the one or more NUs for satisfying their power needs, at block 440.

In one embodiment, the method 500 includes down converting the DC signals into lower rating DC signals prior to supplying the DC signals to the one or more OUs for satisfying their power needs. More specifically, the method 500 includes down converting 220V AC power to 48V DC signal.

In various embodiments, the method 500 may also include feeding the data signals to the one or more NUs for maintaining data integrity.

In this manner, the devices 1000 of the present invention are useful in providing power to OUs, such as ONTs and ONUs installed at subscriber's premises in a simple and convenient manner. Particularly, the requirement to provide alternate power arrangements, such as battery back-ups can be avoided. Moreover, the device 1000 may be easily retro-fitted in existing subscriber connections without requiring much change in the hardware circuitry or electrical wiring, thereby providing a cost-effective solution to power the ONTs. In addition, the device 1000 helps to save space within the telecom boxes, in which generally power sources, such as batteries are conventionally installed. Furthermore, the device 1000 allows a device and method for better utilization of power in optical networks and ensures that the overall cost to the subscriber for subscribing of various services is lowered. Moreover, the device 1000 precludes the use of multiple power points in subscriber's premises or complex.

Further, the present invention should not be construed to be limited to the configuration of the device 100 as described herein only. Various configurations of the device are possible which shall also lie within the scope of the present invention. For instance, the device 100 may include a number of splitters adapted for providing power and data to a plurality of ONTs simultaneously.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. A device retro-fitted, for providing power to one or more Network Utilities (NUs) in an optical network, the device comprising:
   one or more Power over Ethernet (POE) adapters coupled to a plurality of devices of subscribers, wherein the one or more POE adapters are configured to:
       derive an AC power and data signals from the plurality of devices of the subscribers,
       convert the derived AC power into 48V DC signals, and
       output the 48V DC signals and the data signals to at least one POE splitter electrically coupled to the one or more POE adapters; and
   the at least one POE splitter configured to:
       receive the 48V DC signals and the data signals from the POE adapters,
       split the 48V DC signals from the data signals, down convert the 48V DC signals into 12V DC signals, and provide the 12V DC signals and the data signals to the one or more NUs, wherein the 12V DC signals is equally distributed to each of the NUs.

2. The device of claim 1, further comprising one or more cables for coupling the one or more POE adapters to the plurality of devices of the subscribers, and the one or more POE adapters to the at least one POE splitter.

3. The device of claim 2, wherein the one or more cables comprise one or more CAT 5 cables.

4. The device of claim 1, wherein the at least one POE splitter feeds the data signals to the one or more NUs.

5. The device of claim 1, wherein the one or more POE adapters derives the AC power from an external power source.

6. The device of claim 1, wherein the at least one POE splitter includes a down converter-to down convert the 48V DC signals into the 12V DC signals.

7. The device of claim 1, wherein the one or more NUs comprise one or more Optical Network Units (ONUs).

8. The device of claim 1, wherein the one or more NUs comprise one or more Optical Network Terminals (ONTs).

9. A method for providing power to one or more Network Utilities (NUs) in an optical network, the method comprising:

deriving, by one or more Power over Ethernet (POE) adapters, an AC power and data signals from a plurality of devices of subscribers;

converting, by the one or more POE adapters, the AC power into 48V DC signals;

outputting, by the one or more POE adapters, the 48V DC signals and the data signals to at least one POE splitter electrically coupled to the one or more POE adapters;

splitting, by the at least one POE splitter, the data signals from the 48V DC signals;

down converting, by the at least one POE splitter, the 48V DC signals into 12V DC signals; and providing, by the at least one POE splitter, the 12V DC signals and the data signals to the one or more NUs, wherein the 12V DC signals is equally distributed to each of the NUs.

* * * * *